United States Patent [19]

Wagner

[11] Patent Number: 4,472,100

[45] Date of Patent: Sep. 18, 1984

[54] TRAILER GOOSENECK COUPLING APPARATUS

[76] Inventor: Wilbert A. Wagner, U.S. Hwy. 20, Garden Prairie, Ill. 61038

[21] Appl. No.: 330,897

[22] Filed: Dec. 15, 1981

[51] Int. Cl.$^3$ ............................................. B62D 53/06
[52] U.S. Cl. ..................?............... 414/481; 280/423 B
[58] Field of Search ..................... 414/481; 280/423 B, 280/425 A

[56] References Cited

U.S. PATENT DOCUMENTS

| | | | |
|---|---|---|---|
| 3,043,609 | 7/1962 | Talbert | 280/423 B |
| 3,066,954 | 12/1962 | Brockman | 414/481 X |
| 3,215,449 | 11/1965 | Talbert | 280/425 A |
| 3,536,340 | 10/1970 | Talbert | 414/481 X |
| 3,866,947 | 2/1975 | Yakubow | 280/425 A |
| 4,219,211 | 8/1980 | Sauers | 280/423 B X |
| 4,367,884 | 1/1983 | Johnson et al. | 280/423 B |
| 4,390,192 | 1/1983 | Wagner | 280/425 A |

Primary Examiner—Robert J. Spar
Assistant Examiner—Ken Muncy
Attorney, Agent, or Firm—Andrus, Sceales, Starke & Sawall

[57] ABSTRACT

A gooseneck apparatus for connecting a lowboy trailer to a truck-tractor includes a horizontal section having a king pin connection and a vertical section. A trailer coupling apparatus is secured to the vertical section and to the tractor. A hydraulically actuated lift mechanism positions the gooseneck apparatus with respect to a tractor bed. The gooseneck apparatus includes forward slotted plates adapted to mate with coupling pins on the trailer for vertical support of the trailer. A horizontal coupling includes a pneumatic operated vertical coupling pin on the gooseneck and releasably placed in a pin opening in a front plate on the trailer. The vertical sections include load walls which pivot between a vertical support position and a release position. The latter permits collapse of the gooseneck apparatus and the trailer bed to allow separation of the trailer and gooseneck apparatus. A manually operated linkage is coupled to move said load walls between said positions during the connecting and disconnecting of the trailer. A mechanical latch safety unit is connected to the vertical coupling pin positioning linkage to lock the pin in the operating position and is also connected to the manually operated linkage. The safety unit is constructed such that the load walls can only move to the load position with the safety unit moved to the locking position to ensure latching of the coupling pin in place with the trailer connected to the truck-tractor.

9 Claims, 6 Drawing Figures

TRAILER GOOSENECK COUPLING APPARATUS

BACKGROUND OF THE PRESENT INVENTION

This invention relates to a trailer gooseneck apparatus and particularly for interconnecting of a low-boy trailer to a truck tractor.

Commercial trucking includes semitrailer systems wherein a truck tractor is releasably coupled to a trailing load carrying trailer for over the road transport of loads. A low-boy trailer is widely used for transport of off-road construction equipment, such as graders, shovels and the like. The trailer has a flat bed supported at the trailing end by one or more sets of tired wheel supports. A gooseneck apparatus releasably connects the free forward end of the flat bed to the tractor for over-the-road movement.

A particularly satisfactory gooseneck apparatus is shown in applicant's copending application entitled "Trailer Gooseneck Apparatus" which was filed Dec. 16, 1980 with Ser. No. 06/217,050 now issued to U.S. Pat. No. 4,390,192 on June 23, 1983. The gooseneck apparatus includes a horizontal section having a releasable pivot connector for connection to a truck-tractor and a vertical section including a unique releasable entrance support and connection assembly with the trailer. The vertical section is pivotally interconnected at its forward or tractor end to the understructure of the horizontal section and extends rearwardly beneath the horizontal section. The trailer ends of the horizontal section rests upon the vertical section and the sections are interconnected by a powered actuating means such as hydraulic cylinder units pivotally interconnected to two sections. The lower end of the vertical section is coupled to the low-boy trailer by a combination of horizontal and vertical pin-like connections. A horizontally extended pin and slot connection provides a vertical support with releasable interconnection of the trailer to the tractor. A vertical pin and slot coupling allows corresponding connection of the trailer to the vertical section of the gooseneck. A pivotally mounted load structure, preferably in the form of a plate in the vertical section, is movable with respect to the horizontal section to establish a collapse of the vertical section during the attachment and detachment of the trailer without requiring relative motion between the truck tractor and the trailer bed. The attachment and detachment is established without relative movement between the trailer bed and the tractor.

A simple and reliable coupling includes a pneumatic operated coupling pin interconnected to pin opening connection. The trailer includes a coupling opening which is aligned with a mating coupling pin. A spring return means urges the pin into the coupling position. The pneumatic unit is actuated to withdraw the pin from the vertical opening.

Although the above gooseneck apparatus has been found to provide a highly effective and reliable connection, some concern may arise with respect to the reliability of the trailer connection if proper care is exercised in operating the system or constructing the apparatus. Thus a possible separation may arise if the coupling pin is not properly set or if the pin should retract against because the spring load provided is not proper for particular harsh road conditions. Although heavy spring loading may be provided, this requires a corresponding larger releasable motor means.

SUMMARY OF THE PRESENT INVENTION

The present invention is directed to a positive mechanical latch coupled to the trailering pin to prevent release of the coupling pin in the trailering condition of a gooseneck apparatus. Generally, in accordance with the present invention, a safety member is releasably coupled to the coupling pin linkage. In the preferred gooseneck apparatus the safety member is also connected to the load wall linkage to provide an interrelated positioning thereof.

In the preferred structure, a manually operated linkage is coupled to move said load walls between said positions during the connecting and disconnecting of the trailer. A mechanical safety or latch unit is connected to the trailering coupling member positioning linkage to lock the member in the operating position and is also connected to the manually operated linkage. The safety unit is constructed such that the load walls can only move to the load position with the safety unit moved to the locking position to ensure latching of the coupling pin in place with the trailer connected to the truck-tractor.

The present invention thus establishes a reliable coupling unit for releasable connection of a low bed trailer to a truck tractor with positive locking of the coupling unit in the transport position. The inventor has thus found that this structure produces a reliable, low cost coupling unit which can be used in the environment of over-the-road tractor-trailer apparatus.

DESCRIPTION OF THE DRAWING FIGURES

The drawings furnished herewith illustrate a preferred construction of the present invention in which the above advantages and features are clearly disclosed as well as others which will be readily understood from the following description.

In the drawings.

DESCRIPTION OF THE ILLUSTRATED EMBODIMENT

Referring to the drawings, a conventional truck tractor 1 is connected to a low-bed trailer 2 by a gooseneck apparatus 3, which is shown constructed as shown in the inventor's previously disclosed application. Generally, trailer 2 is a conventional structure having an elongated flat bed 5 supported at the trailing end by a plurality of wheels 6. The flat bed pivots about the wheels 6 with the forward end thereof interconnected to and supported by the gooseneck apparatus 3. The truck tractor 1 is similarly a conventional unit having the rear wheels 8 with a fifth wheel 9 for releasable connection to the gooseneck apparatus 3 and thereby to trailer 2. The gooseneck apparatus 3 generally includes a horizontal section 10 having a forward coupling or king pin 11 releasably connected to the wheel 9 and a trailing vertical support assembly 10a. Vertical assembly 10a includes laterally spaced and interconnected vertical sections 12 located beneath the trailing end to each side of the horizontal section 10. The vertical sections 12 are pivotally interconnected at the top forward end to the underside of the horizontal section 10 by a main pivot support unit 13. The trailing end of each vertical section 12 is similarly interconnected to the horizontal section 10 by a separate hydraulic power cylinder unit 14 for positioning of the corresponding vertical section 12. The power cylinder units 14 are actuated for positioning a vertical trailer coupling assembly 15 and a horizontal coupling assembly 16 between coupling and release positions. Each coupling assembly 15 includes an apertured plate 17 secured to a forward wall 18 of the vertical section 12. The aperture plate 17 includes a coupling opening 18 adapted to move onto a horizontal coupling pin 19 secured to the forward end or wall of the trailer bed 5. In the transport position, the forward end of the trailer bed 5 is held upwardly off the ground and supported conjointly with the trailing wheels 6 in a general horizontal transport position. The horizontal coupling assembly 16 includes a coupling pin 20 on the vertical section 12 which is movable into and from a coupling opening 21 in a central forward portion of the trailer bed 5. Pin 20 couples the tractor 1 to the trailer 2 for over-the-road movement. The pin 20 is resiliently urged into a dropped trailering or engaged position for ease of coupling and is coupled by a linkage 22 to a power operator 23 for raising the pin 20 during trailer decoupling.

Each vertical support section 12 is similarly constructed with back or rear wall 23a having an upper load plate 24 pivotally connected by a pivot support 25 to the lower portion of the rear wall. In the support position of FIG. 2, the load plate 24 is located in the plane of the back wall 23 with the trailing end wall 26 of the horizontal section 10 resting thereon. In the position for attaching or detaching the gooseneck apparatus 3 at assemblies 15 and 16, the load plate 24 is pivoted outwardly of the back wall 26 of the horizontal section to permit collapse of the horizontal section 10 into the vertical support section 12, as shown in FIG. 3.

A mechanical positioning mechanism 27 includes a manually operated handle 28 moveable through 90 degrees for positioning of the load plate 24 in the support position and in the release position. The position mechanism 27 is also connected by a linkage 29 to a safety lock assembly 30 for positively holding pin 20 in the trailering position. The handle is thus operable to simultaneously actuate the load plate 22 and the lock assembly 30. This provides a positive assurance that the trailer 2 cannot accidental decouple from the tractor during travel.

The trailer lift cylinder units 14 are operable to pivot the sections 10 and 12 relative each other about pivot connection 13 to relieve the load from plate 24 and permit the release thereof, as well as to support the vertical section 12 upon section 10.

Figure 1:
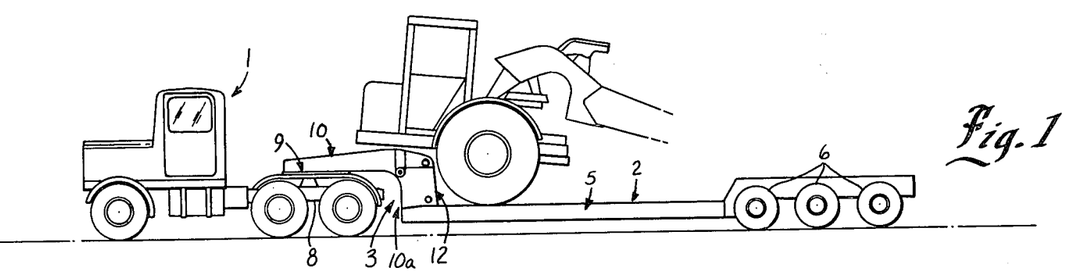
FIG. 1 is an elevational view of the gooseneck apparatus interconnecting a truck tractor and a low-boy trailer.
Figure 2:
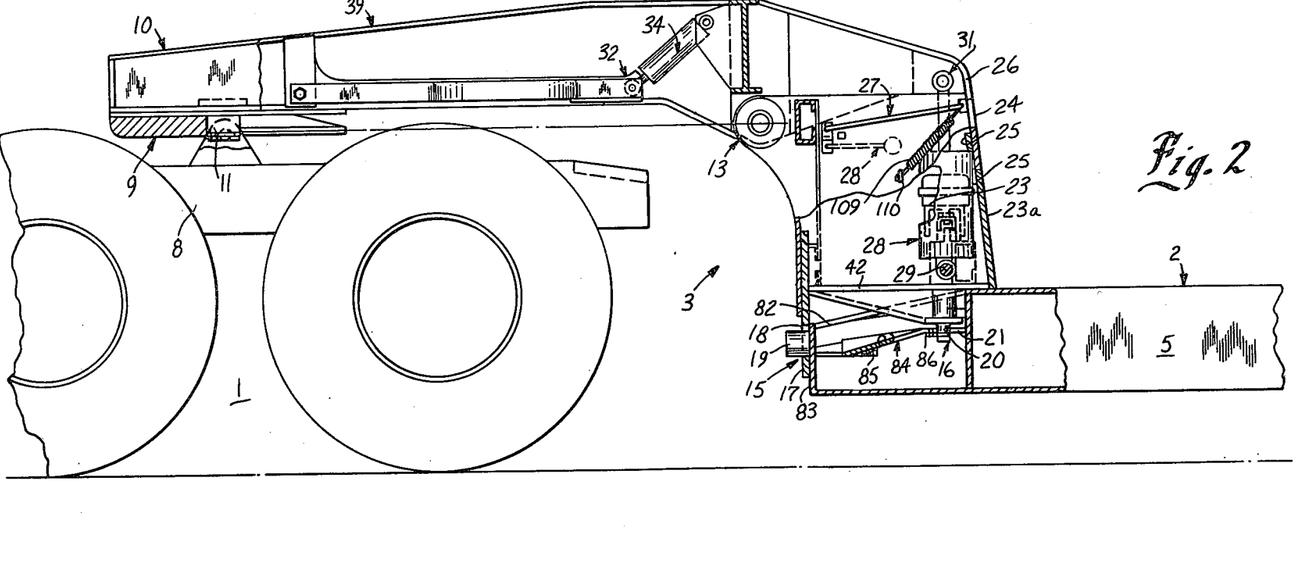
FIG. 2 is a cross-sectional view showing the gooseneck structure in the position connected to the low-boy trailer.
Figure 3:
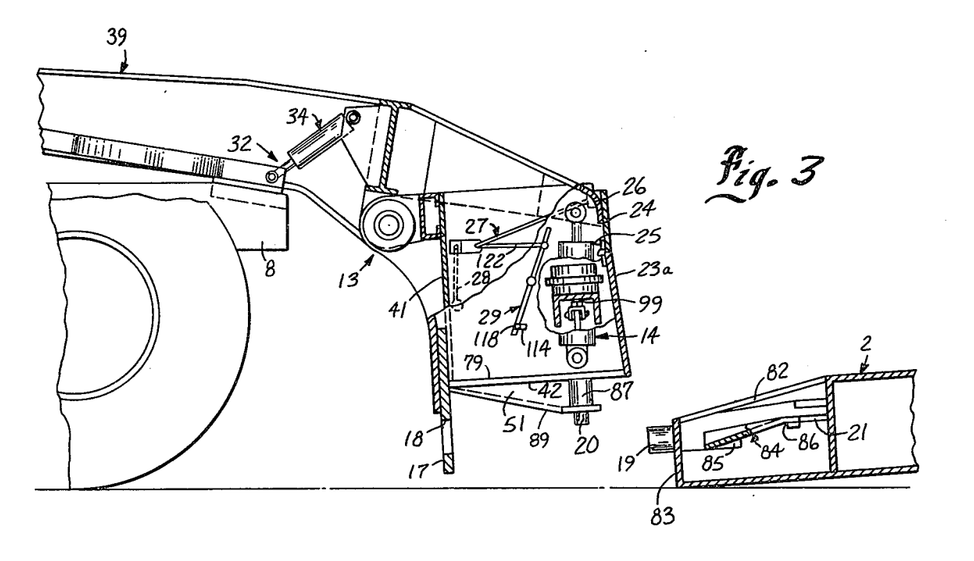
FIG. 3 is a view similar to FIG. 2 with the trailer disconnected.

A gooseneck lift mechanism 32 is provided within a horizontal section 10 and operated by a cylinder unit 34 to raise the gooseneck apparatus 3 and the trailer bed 2 from the ground engaging positioning of FIG. 3 to the trailering portion of FIG. 2.

Each vertical section 12 of the gooseneck apparatus 3 is located in supporting relationship beneath the trailing portions of the side rails 38 and 39 respectively of the horizontal section. Each of the vertical sections is similarly constructed as a box-like support, which includes a pair of side walls 40 interconnected to each other by a forward wall 41, the back wall 23a, lock wall 24 and a bottom wall 42. The box-like vertical section 12 is pivotally secured to the side rail 38 at the pivot connection 13 and at the pivot connection 31.

The forward end of the trailer 2 includes coupling rail projections aligned with vertical sections 12 and having an inclined top wall 82 with a vertical front wall 83 containing the pin 19. In the assembled position, plate 17 abuts wall 83 and the outermost portion of the section bottom wall 42 rests on the trailer bed 5. The horizontal coupling unit 16 includes a plate structure 84 having an inclined entrance plate portion 85 and a final horizontal portion 86 within which the opening 21 is located.

The coupling pin 20 is centered between the vertical sections 12 and thus in alignment with the plate 85 and opening 21. The locking pin 20 is slidably supported in a tubular bushing 87 which extends upwardly through a bottom plate 87a secured between sections 12, immediately inwardly of a forward cross beam 88. A supporting beam 89 is secured to the lower end of bushing 87 and to the underside of plate 87a. A generally U-shaped bracket 90 encircles the upper end of bushing 87 with the forward edges welded or otherwise secured to the cross channel member 88 of the vertical section 12 to establish a rigid strong support for the locking pin 20. The upper end of pin 20 is coupled by the linkage 22 to the power operator 23. The linkage 22 includes a bifurcated connector 91 welded or otherwise firmly affixed to the upper end of the locking pin 20. A plate-like arm 92 is pinned to the connector 91 as at 93 and in turn is pivotally supported intermediate its length in a pivot support bracket 95 secured to the connecting channel and bottom wall. The plate-like arm 92 extends transversely of the gooseneck apparatus 3 with the free end interconnected to the powered operating means 23, which is shown as a bellows or air chamber 96 for selective positioning of locking pin 20. The air chamber 96 of the means 23 is a spring-loaded closed chamber member having an air inlet 97 coupled to a remote controlled air supply. The air chamber 96 is supported on an inverted U-shaped bracket 98 secured to the inner side wall 69 of the one vertical section 12. A threaded operating rod 99 is secured in the bottom wall of the air chamber and depends downwardly in alignment with the outer end of the pivot bar 92. A bifurcated coupling 100 is threadedly connected to the threaded shaft and pinned to the outer end of the pivot bar 92 such that the expansion and contraction of the chamber correspondingly positions the pivot bar 92 and thereby oppositely locates the locking pin 20. The air chamber includes a spring-loaded diaphragm or piston 101 coupled to rod 99. A spring 102 urges the piston 101 to the raised position to resiliently hold the coupling pin 20 in the trailering position. The air inlet means allows the energization of the air chamber and the extension of the operating rod to pivot arm 92 to raise the pin 20 against the force of spring 102. The pivot pin connector 93 includes a slot 103 in the pivot bar 92 to allow straigh line movement of the locking pin 20 and pivotal movement of the pivot bar 92.

To couple the tractor to the trailer, the gooseneck apparatus 3 is moved over the coupling end of the trailer 2. The pin 20 engages the inclined plate 85 and is forced upwardly into the bushing 87 against the force of the spring. At the coupling position, the coupling plates 17 abutt the forward vertical wall 83 of the trailer 2 and pin 20 is located in alignment with the opening 21 and drops outwardly into coupling engagement under the force of the return spring 102. Thus, it is not necessary to raise the pin 20 from the locking position during the coupling or attachment motion between the trailer 2 and tractor 1 to the position of FIG. 3. However, if only the return spring is relied upon as the holding force, the spring must be of such force as to positively guard against accidental release under over-the-road conditions.

In the present invention, the pin 21 is positively locked in the hitch or trailing position by the latch safety unit 30, such that the trailer 2 cannot accidentally be decoupled as a result of the over-the-road travel of the truck-trailer assembly. Generally, the safety pin unit 30 includes a member 114 adapted to be located to mechanically hold the arm 92 and therefor pin 20 in the coupling position. The safety unit 30 is connected by the linkage unit 29 to the load plate position mechanism 27 for simultaneous movement with operation of handle 28 to position the load plate 24 between the load support and the release positions.

Figure 4:
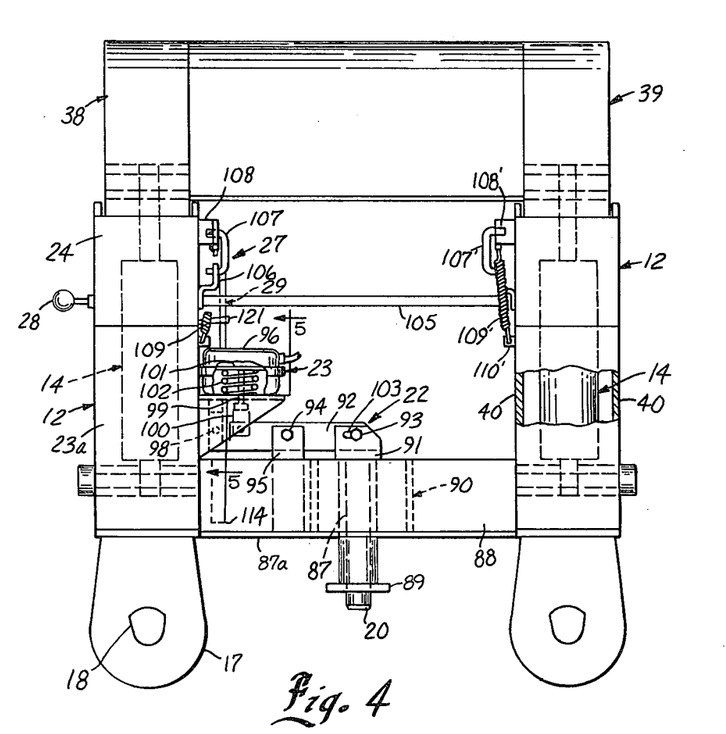
FIG. 4 is an end view from the back side of the gooseneck apparatus.
Figure 5:
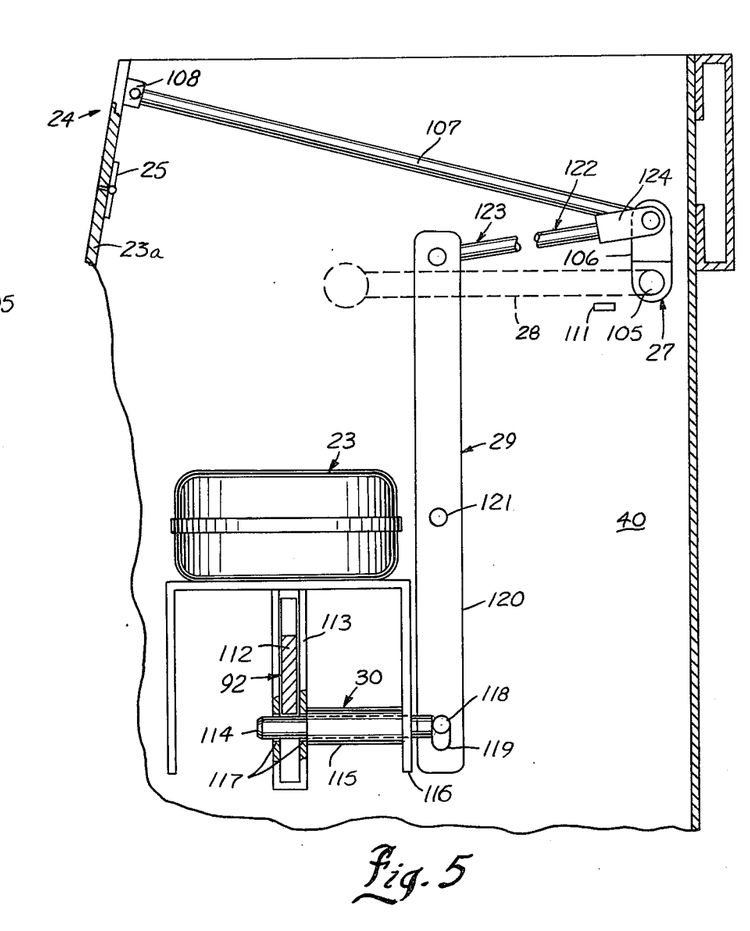
FIG. 5 is a fragmentary side view of a gooseneck structure taken generally on line 5—5 of FIG. 4 and a safety latch unit illustrating one embodiment of the invention.
Figure 6:
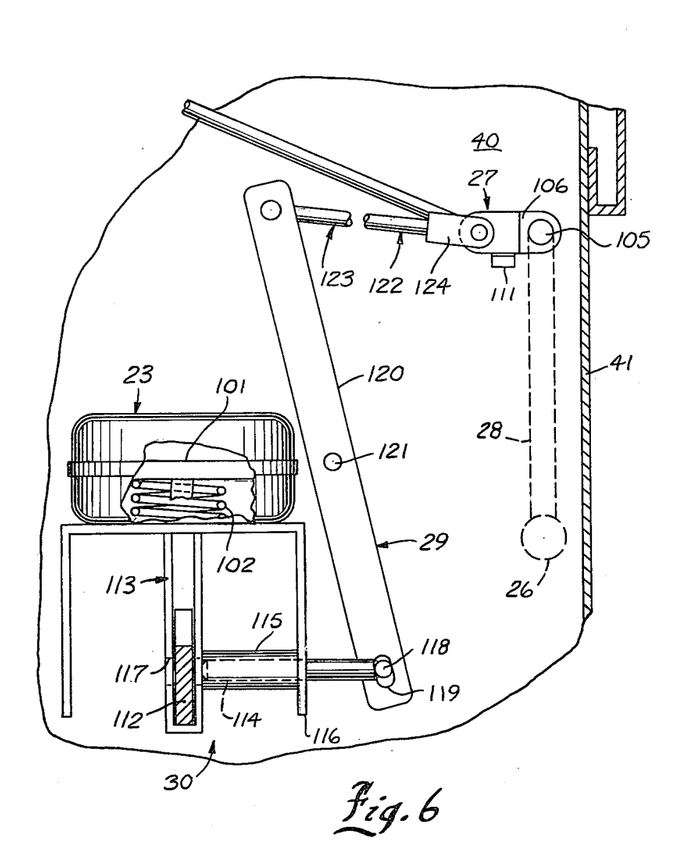
FIG. 6 is a view similar to FIG. 5 illustrating the disconnection position of the safety latch unit.

As most clearly shown in FIGS. 2 and 5 the illustrated locking plate release mechanism 27 particularly includes a common shaft 105 extended through the vertical sections 12 and connected at the one side to the operating arm 28. The mechanism 26 preferably includes similar over-center spring-loaded linkage assemblies between the shaft 105 and the load plates 24 of the two vertical sections 12 at the inside wall 40 of each of the vertical sections. The over-spring mechanism, as shown in FIGS. 4-6 includes an actuating lever 106 secured to the shaft 105. The lever 106 includes an offset plate member having a first portion fixedly connected as by welding to the shaft 105 and an inwardly offset plate-like portion. A connecting U-shaped link 107 has one end bent at ninety degrees and secured within a suitable opening within the outer end of the lever 106. A positioning tab 108 is welded or otherwise secured to the upper end of the load plate 24 and provided with an opening receiving the opposite inwardly bent end of the connecting link 107. A coil spring 109 is secured at the upper end to the load plate tab 108 and extends forwardly and downwardly therefrom. The lower spring end of the spring 108 is secured by a bracket 110 to the inner side wall of the vertical section. The lever 106 in the load position of the load plate 24 extends vertically upwardly, as shown in FIG. 5. The handle 28 and shaft or rod 105 pivots in a counterclockwise direction, as viewed in FIG. 5 to move lever 106 and force the link 107 outwardly toward the load plate 24, thereby forcing the load plate 24 to pivot about its pivot connection 25 and move outwardly of the load wall 26. The load plate 24 moves outwardly with the initial movement also elongating the spring 109 to a maximum extension, with the final movement of the load plate 24 pivoting the spring 109 over a maximum extension position whereby the spring collapses and the plate pivots outwardly to provide an over-center latching of the load plate 24 in the release position. A stop bar 111 is shown located adjacent to the pivot lever 106 to stop the linkage immediately after it moves over the center and thereby limits the motion of the linkage assembly. The spring loaded mechanism 27 holds the load plates 24 in the release position even after release of the handle 28. The mechanism is reversed or reset by opposite pivoting of handle 28.

In the over-the-road travel position for highway travel and the like, the side rails 38 and 39 thus rest on the load plates 24 and provide a firm reliable support. The vertical locking pin 20 is extended and rests against the front surface of the locking pin hole 21 in the trailer 2 and the trailer pins 19 are supported upon the bottom of the trailer pin slots 18. The locking pin is secured in place by the spring member 109 and more particularly is further secured in place by the positive safety unit or assembly 30 to avoid accidental trailer release during over-the-road movement.

A preferred embodiment of the invention is shown in the drawings for the linkage unit 26 shown in applicant's copending application and which may be applied thereto if the additional safety feature is desired.

Referring to the drawings and particularly to FIG. 4, the arm 92 is pivotally mounted as at 94 and the outer end portion is pivotally connected to the plunger 99 of air cylinder unit 23. A latch end member 112 extends rearwardly of the plunger connection into the locking or latch unit 30, which is operable to positively lock the arm 92 and therefor the trailing pin 20 in the fixed trailering position.

The illustrated safety unit includes a bracket 113 welded or otherwise secured to the underside of the mounting bracket 98. The bracket is a U-shaped member defining an opening approximating the width of the arm 92 and of a greater depth to permit the pivotal movement of the arm 92. A locking or safety pin 114 is selectively positioned within the walls of bracket 113 slightly beneath the arm 92 with the trailing pin 20 in the trailing position to provide the positive mechanical latch of the arm and pin when in such position. As more fully developed hereinafter, the locking pin 114 can only be placed in the locking position with the arm 92 in the trailering position.

Generally, the safety pin 114 is coupled by the linkage 29 to the load plate positioning linkage 27 and simultaneously moved with the positioning of the load plates 24. Thus, the safety pin 114 is located in the locking position in response to the movement of the load plates 24 to the load carrying position. The mechanical latch, in combination with the position by and with the load plate linkage mechanism 27, insures that the trailer 2 cannot be placed in the trailering position without the safety pin 114 in the locking position, which can only be established with pin 20 locked in the trailering position. This then insures that the trailer 2 is positively and reliably locked to the tractor 1 whenever it is moving over the road.

More particularly, in the illustrated embodiment, the latch bracket 112 is welded or otherwise secured to the underside of the inverted U-shaped mounting bracket 98. The extension member 112 of arm 92 extends into the bracket 113 and pivots within the bracket in response to the coupling and de-coupling movement of the gooseneck and particularly the locking pin 20 with respect to the trailer 2. The latch safety pin 114 is a rod-like member slidably supported in a tubular bushing 115 welded or otherwise secured to the one side of the safety pin bracket 113 and to the adjacent outer flange 116 of the mounting bracket 98. The pin 114 is aligned with corresponding openings 117 in the two sidewalls of the U-shaped bracket 113. The pin 114 extends outwardly through the mounting bracket 116 and is coupled by the connecting linkage 29 to the load plate linkage 26. In the illustrated embodiment of the invention, a coupling pin 118 is welded to the outer end of the safety pin 114 and fixed within a slot 119 in a pivotally mounted connecting link 120. A pivot pin 121 pivotally secures the link to the adjacent sidewall 40 of the vertical section 12. The link 120 extends upwardly with the upper end generally aligned with the pivot shaft 105 of the load plate linkage 27. A connecting link 122 secures the upper end of the link 120 and to the pivot lever 106 of the load linkage 27. The connecting link 122 is shown as an adjustable unit including a first rod-like member 123 having a bent end secured within an opening in the upper end of the link 120 and threaded into a connecting bushing 124 which in turn is pivotally secured to the lever 106 secured to shaft 105. The connecting link 122 is made adjustable so that the movement of the locking or safety pin 114 and the positioning of the load plates 24 are precisely coordinated. This accurate positioning is important to insure that the load plate is totally engaged load bearing position whenever the safety pin 114 is in locking position. Thus, the locking pin linkage 29 cannot interfere with the location of the load plates 24 in such a manner as to provide a partial load plate engagement, which might be adequate under stationary conditions but which might not provide a sufficient support for over-the-road conditions.

Thus, the pivot load plates 24 and the pivot lever 106 is normally in a raised position with the load plates 24 in the support position. This results in rotation of the upper end of the link 120 to the vertical position, in which the safety pin 114 is located laterally through the bracket openings 117 immediately beneath the locking arm 92. If the arm 92 is not fully raised, indicating that the coupling pin 20 is not fully in the trailering position, the safety pin 114 could not move through the bracket opening 117 and beneath the arm 92. Thus, the arm member 112 would at least partially overlap the first safety pin opening 117. The linkage arm 121 could not therefore pivot to the vertical position, and the linkage 27 could not move the load plates 24 to place the load plates in the even a partial load carrying position. Thus, release of the vertical cylinder units 14 in this state would automatically decouple the gooseneck 3.

With proper location of pin 20 in opening 21, the pin 114 readily moves to the safety position to mechanically lock member 92 and therefor pin 20 in the trailering position simultaneously with the complete movement of the plates 24 to the proper load carrying position.

To release the trailer, the load plates 24 must be released to collapse the horizontal section into the vertical section 12. Simultaneously with such release or positioning of the load plates 24, the safety pin linkage 29 is reset with the lever 106 of plate linkage 27 and the upper end of the link 120 rotating in a counterclockwise direction to the position of FIG. 6. The lower end of the link 120 rotates away from the bracket 113 and results in a retracting motion of safety pin 114 from the bracket 113. This of course completely releases the coupling pin arm 92. The air cylinder or air unit 23 may then be actuated to pivot the arm 92 in a counterclockwise direction as viewed in FIG. 4, thereby raising the pin 20 from its locking position with respect to the trailer 2 and allowing release of the trailer unit.

To again lock the trailer 2 to gooseneck apparatus 3, the reverse sequence is followed with a reverse movement of linkages 27 and 29 replacing the plates 24 in the load position and the pin 114 in the latching position.

The mechanical latching arrangement of the present invention in the collapsible gooseneck apparatus thus provides not only a positive locking of the trailering unit in the trailer position but provides a positive interlock between the special load release mechanism and the trailering mechanism to insure positive interrelation and positioning of the gooseneck apparatus.

As in the previous embodiment, to release the trailer 2, the air is supplied to the air chamber, which retracts the locking pin 20 and thereby fully release the gooseneck apparatus 3 from the trailer 2. The trailer air lines and the electrical line are disconnected from the gooseneck apparatus, and the gooseneck apparatus can be removed by driving the tractor 1. To reconnect the gooseneck apparatus 3 to the tractor 2, the air is removed from air chamber, thereby allowing the spring-loaded locking pin 20 to fully extend. Tractor 1 is backed toward the trailer and the gooseneck is thereby moved onto the trailer 2. The plate 84 engages the pin 20 and centers the gooseneck 3 on the trailer 2. The inclined cam plate 84 on the trailer retracts the locking pin 20 to move over the locking plate and into the pin hole 21. The spring-loaded pin 20 then extends itself to lock the gooseneck apparatus 3 to the trailer 2. The gooseneck lift cylinder units 14 are extended to raise the trailer till the spring-loaded load plates 24 fall into position. Handle 28 is reset to the trailer coupling position to rotate plates 24 into precise alignment with the load walls 26 and simultaneously locate the locking pin beneath the link arm 92 to mechanically lock the pin 20 in the trailering position. The pressure on the cylinder units 14 is relieved until the side rails 38–39 of the gooseneck apparatus 3 are again resting on the aligned load plates 24 of the vertical sectons. The air lines and electrical line are reconnected to the gooseneck apparatus, and the trailer 2 is again locked in the travel position of FIG. 2.

The present invention thus provides an improved trailer coupling apparatus which may be readily constructed as a rugged unit having a positive and reliable connection while permitting convenient attachment and detachment to a trailer.

Various modes in carrying out the invention are contemplated as being within the scope of the following claims, particularly pointing out and distinctly claiming the subject matter which is regarded as the invention.

I claim:

1. A gooseneck apparatus for releasably connecting a tractor unit to a trailer unit and including an interconnected horizontal and vertical sections with a first vertical trailer coupling means having a first member adapted to be connected to the forward end of the trailer unit and a second member connected to the bottom end of said vertical section and with a horizontal coupling means having a first member connected to said vertical section and a second member adapted to be connected to said trailer unit and establishing a pivotal horizontal trailering connection, said first and second member of said horizontal coupling being relatively movable for connection and disconnection of the trailer, a safety means releasably connected to said horizontal coupling means and moveable to a locking position for preventing relative movement of the first and second members of the horizontal coupling means in response to positioning of the gooseneck apparatus in the trailering position, a releasable collapsible means connecting said horizontal and vertical sections and including a load member moveable between a load position and a release collapsing position, a first mechanical linkage for moving said load member between said load position and said release position, a second mechanical linkage for actuating of said safety means, means interconnecting of said first and second linkages to a common operator to provide simultaneous positioning of the safety means in the locking position and the load member in the load position, and said safety means being operable to permit movement of the load member to the load position only with said safety means moving to said locking position and thereby prevent accidental release of the horizontal coupling means.

2. The apparatus of claim 1 wherein said second linkage means includes an adjustable link connector to permit accurate positioning of the safety means and the load member.

3. The gooseneck apparatus of claim 1 wherein said first and second members of said horizontal coupling means are resiliently biased to an engaged position, and a powered means operator 23 is connected to one of said members to move said members to a disengaged position.

4. The apparatus of any one of the claims 1, 2 or 3 wherein said first and second members of said horizontal coupling means are a slotted means and a pin.

5. A gooseneck apparatus for releasably connecting a truck-tractor unit to a trailer unit having trailing wheel means and said apparatus having a horizontal section with a forward tractor pivot means for releasable connection to a tractor and a vertical section and a pivot support means pivotally connected to the vertical section and to the trailer end of the horizontal section with a power means connected between said horizontal section and said vertical section for relatively positioning said vertical section about said pivot support means, said horizontal and vertical sections being constructed and arranged with a releasable load transmitting member supporting the horizontal and vertical sections in a load transport position and movable to a release position to permit relative movement between said horizontal and vertical sections and to a load position supporting the horizontal and vertical sections in a load transport position with said horizontal section resting on said vertical section, the improvement in a trailering coupling between said vertical section and the trailer unit comprising a vertical trailer coupling means having a first member adapted to be connected to the forward end of the trailer unit and a second member connected to the bottom end of said vertical section, a horizontal coupling means having a first member connected to said vertical section and a second member adapted to be connected to said trailer unit and establishing a pivotal horizontal connection, said first and second members of said horizontal coupling means being movable between a trailering engaged position and a disengaged position and being resiliently biased to said engaged position, an operator means to move said first and second members of said horizontal coupling means to said disengaged position, a safety member movably into locking engagement with at least one of said members of said horizontal coupling means with said members in the engaged position to prevent movement to said disengaged position, and linkage means connected to said load transmitting member and to said safety member and having an operator for moving said linkage means to simultaneously position said load transmitting member in the loading position and said safety members into said locking engagement.

6. The gooseneck apparatus of claim 5 wherein said vertical coupling means includes a depending plate means secured to the forward portion of the vertical section, said plate having a coupling opening, said vertical coupling means including a horizontally projecting pin means adapted to releasably mate with said coupling opening whereby said vertical section overlies said trailer unit with said depending plate means abutting said trailer unit, and said horizontal coupling means being located centrally of said trailer unit and having said first member includes a vertically movable coupling pin secured to said vertical section and having said second member including a coupling opening in the top of the trailer unit to receive said coupling pin, a coupling linkage connecting said operator means to said coupling pin, and said safety member being coupled to said linkage to prevent movement thereof.

7. The apparatus of claim 6 wherein said vertical section includes a plate having a vertical bushing and said horizontal coupling means includes said coupling pin journalled in said bushing, said operator means includes a pneumatically operated chamber mounted above said plate and spring biased to hold the linkage and said coupling pin in the engaged position, said linkage includes a lever means connecting the upper end of said pin to said chamber, said second member of said horizontal coupling means being an apertured plate including an inclined ramp portion and a horizontal portion containing said coupling opening, said inclined ramp portion having an outer end located below the lower most end of said pin in the engaged position and operable to force said pin upwardly in response to relative horizontal movement of the pin over said apertured plate, said linkage means to simultaneously position said load transmitting member and said safety member including an over-center linkage mechanism having an operating handle and secured by a first linkage to said load transmitting member of the vertical section and by a second linkage to said safety member and operable to lock said load transmistting member in said release and said load positions.

8. The gooseneck apparatus of claim 7 wherein said coupling pin is connected to said pneumatically operated chamber by said coupling linkage and said coupling linkage including a pivotally mounted arm, a locking bracket mounted adjacent said arm and having a locking opening, said safety member is a safety pin movable through said locking opening into the path of said arm to positively hold the arm in place with the coupling pin in the engaged position.

9. The gooseneck apparatus of claim 8 wherein said bracket includes spaced side walls extending to the opposite side of said arm, a bushing being secured to one of said side walls and slidably supporting said safety pin, a pivotal lever secured to said safety pin, an operating handle unit movable mounted to said vertical section, and an adjustable link connecting said lever to said handle.

* * * * *

UNITED STATES PATENT AND TRADEMARK OFFICE
CERTIFICATE OF CORRECTION

PATENT NO. : 4,472,100                                   Page 1 of 2

DATED     : September 18, 1984

INVENTOR(S) : WILBERT A. WAGNER

It is certified that error appears in the above-identified patent and that said Letters Patent is hereby corrected as shown below:

Col.3, Line 19, after "wall" delete ---18---; Col. 3, Line 26, delete "general" and substitute therefore ---generally---; Col. 3, Line 55, delete "22" and substitute therefore ---24---; Col. 4, Line 64, delete "straigh" and substitute therefore ---straight---; Col. 7, Line 21, after "engaged" insert ---in---; Col. 7, Line 42, after "plates in" cancel "the"; Col. 8, Line 15, after "the" delete "tractor" and substitute therefore ---trailer---; Col. 8, Line 34, delete "sectons" and substitute therefore ---sections---; Col. 9, Line 20, after "powered" delete "means operator" and substitute therefore ---operator means---;

Col. 10, Line 61, delete "movable" and substitute therefore ---movably---; Col. 10, Line 45, delete "transmistting" and substitute therefore ---transmitting---;

UNITED STATES PATENT AND TRADEMARK OFFICE
CERTIFICATE OF CORRECTION

PATENT NO. : 4,472,100

DATED : September 18, 1984

INVENTOR(S) : Wilbert A. Wagner

It is certified that error appears in the above-identified patent and that said Letters Patent is hereby corrected as shown below:

Column 3, line 57, "accidental" should read --accidentally--.

Signed and Sealed this

Twenty-third Day of July 1985

[SEAL]

Attest:

DONALD J. QUIGG

Attesting Officer

Acting Commissioner of Patents and Trademarks